(12) United States Patent
Spangler et al.

(10) Patent No.: US 11,651,235 B2
(45) Date of Patent: May 16, 2023

(54) GENERATING A CANDIDATE SET OF ENTITIES FROM A TRAINING SET

(71) Applicant: INTERNATIONAL BUSINESS MACHINES CORPORATION, Armonk, NY (US)

(72) Inventors: William S. Spangler, San Martin, CA (US); Alix Lacoste, Brooklyn, NY (US); Katherine Shen, Corona, CA (US); Hrishikesh Sathe, Sunnyvale, CA (US); Jacques Labrie, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1132 days.

(21) Appl. No.: 16/202,478

(22) Filed: Nov. 28, 2018

(65) Prior Publication Data
US 2020/0167663 A1 May 28, 2020

(51) Int. Cl.
*G06F 7/08* (2006.01)
*G06N 5/02* (2023.01)
*G06F 16/28* (2019.01)

(52) U.S. Cl.
CPC .......... *G06N 5/02* (2013.01); *G06F 7/08* (2013.01); *G06F 16/285* (2019.01)

(58) Field of Classification Search
CPC ............ G06F 7/08; G06F 16/285; G06N 5/02
See application file for complete search history.

(56) References Cited

U.S. PATENT DOCUMENTS

| | | | |
|---|---|---|---|
| 9,317,613 B2 | 4/2016 | Selvaraj et al. | |
| 2007/0130561 A1* | 6/2007 | Siddaramappa | .... G06F 11/3604 717/106 |
| 2011/0264651 A1* | 10/2011 | Selvaraj | .............. G06F 16/9535 707/723 |
| 2013/0246321 A1 | 9/2013 | Pandit et al. | |
| 2016/0078111 A1 | 3/2016 | Schiff et al. | |
| 2018/0032678 A1 | 2/2018 | Dandala et al. | |
| 2020/0202171 A1* | 6/2020 | Hughes | .................. G06N 7/005 |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Andrea C Leggett
(74) *Attorney, Agent, or Firm* — Alexis N. Hatzls

(57) ABSTRACT

A method, computer system, and a computer program product for generating a candidate set of entities from a training set of entities is provided. The present invention may include determining an ontology class for an input entity in the training set of entities. The present invention may include adding the input entity to an ontology list. The present invention may then include assigning an entity score to the input entity. The present invention may also include normalizing the ontology list of entity scores. The present invention may lastly include selecting the candidate set of entities with the highest entity score.

20 Claims, 7 Drawing Sheets

300

| Gene | Score | Metric |
|---|---|---|
| CCNB1 | 0.621732439 | 1 |
| BAZ1B | 0.353840915 | 2 |
| NPM1 | 0.236363097 | 3 |
| PLK1 | 0.216280044 | 4 |
| PLK3 | 0.211939666 | 5 |
| VRK1 | 0.206274301 | 6 |
| ARG1 | 0.195923942 | 7 |
| GOLGA2 | 0.191974333 | 8 |

302

| Gene | Score | Metric |
|---|---|---|
| SIN3B | 1.002289957 | 1 |
| CCNA2 | 0.598590428 | 2 |
| CCNE1 | 0.529575165 | 3 |
| CCNA1 | 0.517973948 | 4 |
| CCNE2 | 0.513772267 | 5 |
| HIST1H3A | 0.500675849 | 6 |
| BAZ1B | 0.391152742 | 7 |
| CCNB1 | 0.369630129 | 8 |

304

| Gene | Score | Metric |
|---|---|---|
| CTNNB1 | 0.582850459 | 1 |
| SMAD3 | 0.56045795 | 2 |
| IFNG | 0.557049459 | 3 |
| ATF4 | 0.517362564 | 4 |
| ERBB3 | 0.502404974 | 5 |
| SERPINE2 | 0.500114312 | 6 |
| CCNA2 | 0.376023463 | 7 |
| JUN | 0.287353301 | 8 |
| NKX2-1 | 0.267113644 | 9 |

Table 300

| Gene | Score | Metric |
|---|---|---|
| CCNB1 | 0.621732439 | 1 |
| BAZ1B | 0.353840915 | 2 |
| NPM1 | 0.236363097 | 3 |
| PLK1 | 0.216280044 | 4 |
| PLK3 | 0.211939666 | 5 |
| VRK1 | 0.206274301 | 6 |
| ARG1 | 0.195923942 | 7 |
| GOLGA2 | 0.191974333 | 8 |

Table 302

| Gene | Score | Metric |
|---|---|---|
| SIN3B | 1.002289957 | 1 |
| CCNA2 | 0.598590428 | 2 |
| CCNE1 | 0.529575165 | 3 |
| CCNA1 | 0.517973948 | 4 |
| CCNE2 | 0.513772267 | 5 |
| HIST1H3A | 0.500675849 | 6 |
| BAZ1B | 0.391152742 | 7 |
| CCNB1 | 0.369630129 | 8 |

Table 304

| Gene | Score | Metric |
|---|---|---|
| CTNNB1 | 0.582850459 | 1 |
| SMAD3 | 0.56045795 | 2 |
| IFNG | 0.557049459 | 3 |
| ATF4 | 0.517362564 | 4 |
| ERBB3 | 0.502404974 | 5 |
| SERPINE2 | 0.500114312 | 6 |
| CCNA2 | 0.376023463 | 7 |
| JUN | 0.287353301 | 8 |
| NKX2-1 | 0.267113644 | 9 |

FIG. 3

| Gene | Metric |
|---|---|
| CCNB1 | 1 |
| SIN3B | 1 |
| CTNNB1 | 1 |
| SMAD3 | 2 |
| CCNA2 | 2 |
| IFNG | 3 |
| BAZ1B | 3 |
| NPM1 | 4 |
| CCNE1 | 4 |
| ATF4 | 4 |

GENERATING A CANDIDATE SET OF ENTITIES FROM A TRAINING SET

BACKGROUND

The present invention relates generally to the field of computing, and more particularly to data driven analytics.

An entity may be something that exists by itself as a subject or may be an object having certain attributes and/or behaviors. A class may be a group of entities that share one or more similar attributes and/or behaviors (e.g. a classification or categorization). An ontology may be a grouping of classes that belong to a particular domain. An entity may belong to one or more classes and each class may have one or more entities.

Finding a candidate set of entities when given a small training set may be a primary objective in biology and other domains with rich ontologies. The goal may be to find the most relevant entities to each of the entities in the training set. By using a classification of entities into different classes and classes into ontologies, we may apply a novel approach to finding candidate entities which may be similar to a training set of entities.

SUMMARY

Embodiments of the present invention disclose a method, computer system, and a computer program product for generating a candidate set of entities from a training set of entities. The present invention may include determining an ontology class for an input entity in the training set of entities. The present invention may include adding the input entity to an ontology list. The present invention may then include assigning an entity score to the input entity. The present invention may also include normalizing the ontology list of entity scores. The present invention may lastly include selecting the candidate set of entities with the highest entity score.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 is an exemplary embodiment of input to the candidate entities program according to at least one embodiment;

DETAILED DESCRIPTION

Figure 1:
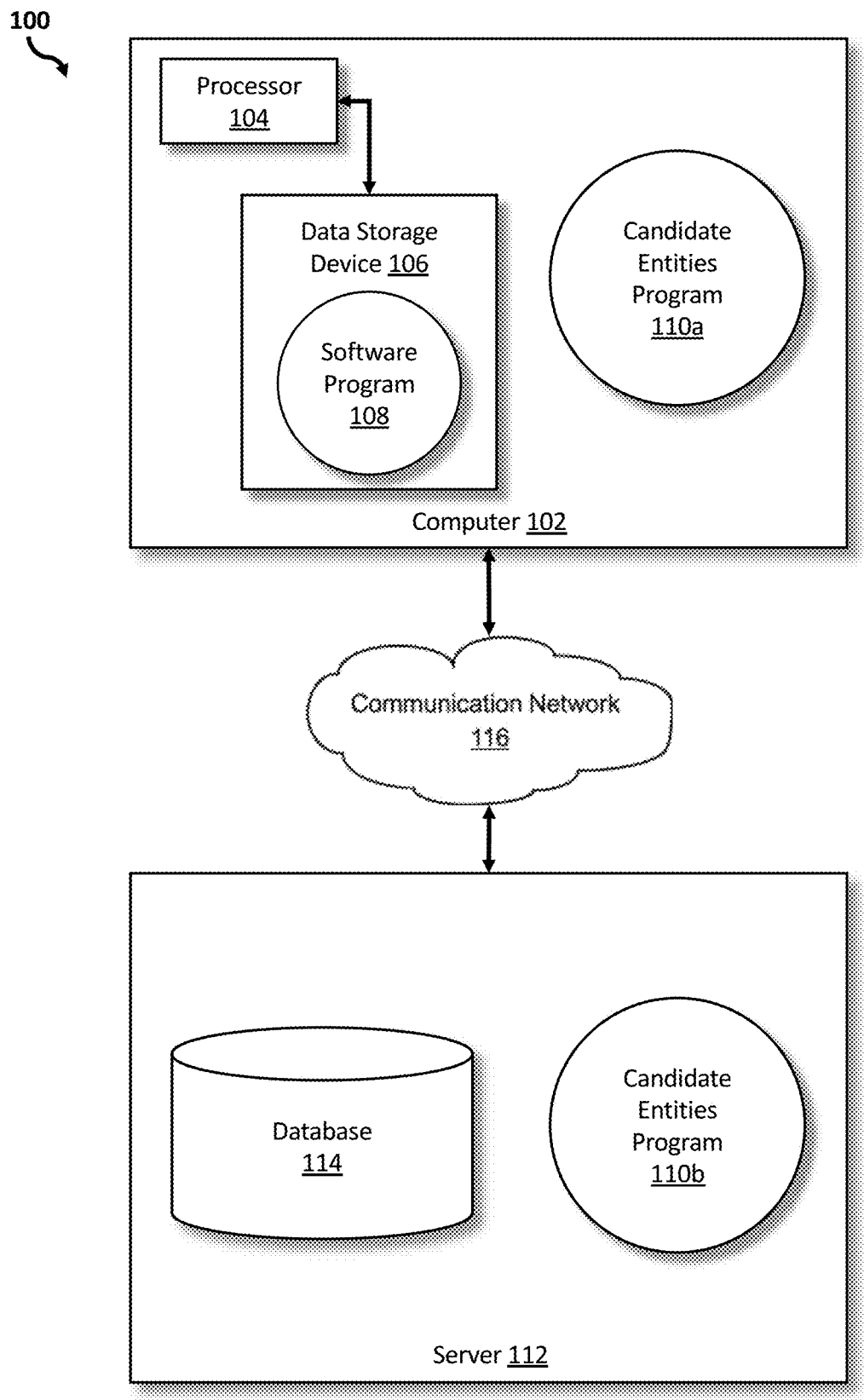
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating a candidate set of entities from a training set. As such, the present embodiment has the capacity to improve the technical field of data driven analytics by using the classification of entities into different classes and classes into ontologies to find candidate entities which may be similar to a training set of entities. More specifically, the present invention may include determining an ontology class for an input entity in the training set of entities. The present invention may include adding the input entity to an ontology list. The present invention may then include assigning an entity score to the input entity. The present invention may also include normalizing the ontology list of entity scores. The present invention may lastly include selecting the candidate set of entities with the highest entity score.

Embodiments of the present invention recognize that an entity may be something that exists by itself as a subject or may be an object having certain attributes and/or behaviors. A class may be a group of entities that share one or more similar attributes and/or behaviors (e.g. a classification or categorization). An ontology may be a grouping of classes that belong to a particular domain. An entity may belong to one or more classes and each class may have one or more entities.

Embodiments of the present invention recognize that finding a candidate set of entities when given a small training set may be a primary objective in biology and other domains with rich ontologies. The goal may be to find the most relevant entities to each of the entities in the training set. By using a classification of entities into different classes and classes into ontologies, we may apply a novel approach to finding candidate entities which may be similar to a training set of entities.

Embodiments of the present invention recognize that existing methods for finding a candidate set of entities from a training set may rely on counting the co-occurrence of potential entities in documents. This approach may tend to favor commonly occurring and well-known associations with the training entities. However, in practice, scientists may be interested in discovering associations with less well-studied candidates.

Embodiments of the present invention recognize that it may be advantageous to, among other things, provide a method which relies on finding a candidate set of entities based on the classes and ontologies that the entities belong to.

Embodiments of the present invention may make use of the whole set of entities in an ontology (e.g., the set of possible candidates across all classes in an ontology) to find, score, and select the highest scored entities with respect to each of the input entities.

Embodiments of the present invention recognize that a final candidate set of entities may have entities which are most similar to each of the input entities. This approach may be a less error prone and more specific way of finding a candidate set of entities which are similar to a small input set of entities.

Embodiments of the present invention provide that, given one or more input entities, all ontology classes to which the input entities belong may be discovered, as well as all entities for each of the ontology classes. A score may be assigned to each entity of each ontology class, and the scores for entities that exist in more than one ontology class may be added so that a distinct set of scored entities may be generated. Next, the input entities may be removed from the scored set and a metric may be assigned to each entity. Finally, the scored sets may be merged by retaining the entities with the lowest metric across all sets.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a candidate entities program 110a. The networked computer environment 100 may also include a server 112 that is enabled to run a candidate entities program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the candidate entities program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the candidate entities program 110a, 110b (respectively) to use the classification of entities into different classes and classes into ontologies to find candidate entities which may be similar to a training set of entities. The candidate entities method is explained in more detail below with respect to FIGS. 2-4.

Figure 2:
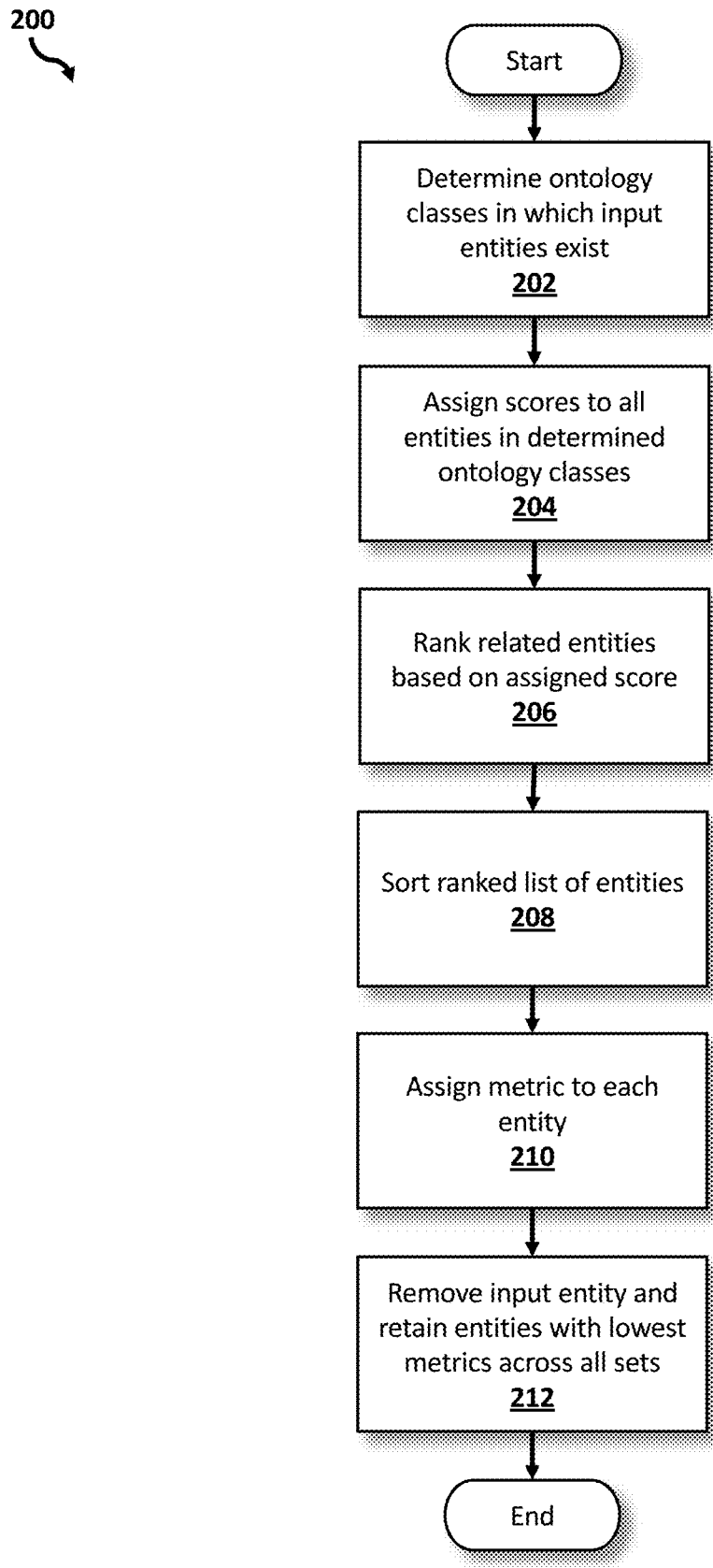
FIG. 2 is an operational flowchart illustrating a process for generating a candidate set of entities according to at least one embodiment.

Referring now to FIG. 2, an operational flowchart illustrating the exemplary candidate entities process 200 used by the candidate entities program 110a and 110b according to at least one embodiment is depicted.

At 202, the candidate entities program 110a, 110b determines the ontology classes to which an input entity exists. For each input entity (e.g., input entity i) within a set of input entities (e.g., input entities I), the candidate entities program 110a, 110b may determine all ontology classes (e.g., ontology classes O) in which each input entity i exists. The candidate entities program 110a, 110b determines the ontology classes to which each input entity exists based on a connected database of mappings (e.g., database 114) which includes mappings of entities to ontology classes. Each entity may belong to one or more ontology classes. At this step, the candidate entities program 110a, 110b may fetch (e.g., obtain, determine) the mappings of entities to ontology classes from the connected database of mappings.

As described previously, a small input set of entities may have one or more entities, and an entity may exist in more than one ontology class. Similarly, each ontology class may have one or more entities.

For example, a small input set of entities is inputted into the candidate entities program 110a, 110b to find a candidate set of entities which are similar to the input entities. The input set and ontology classes are provided below.

Input Entity: A, B

Ontology Classes: $O_1(A, C, D)$, $O_2(B, D, E, F)$, $O_3(A, B, C, D, E, F)$, $O_4(A, F)$ In this example, the candidate entities program 110a, 110b first determines the ontology classes in which each input entity exists. The ontology classes in which each input entity exists are as follows:

$A(O_1, O_3, O_4)$ $B(O_2, O_3)$

The candidate entities program 110a, 110b may then determine all entities for each ontology class. All entities for the ontology classes in which input entity A exists are as follows:

$O_1(A, C, D)$, $O_3(A, B, C, D, E, F)$, $O_4(A, F)$

Likewise, all entities for the ontology classes in which input entity B exists are as follows:

$O_2(B, D, E, F)$, $O_3(A, B, C, D, E, F)$

Next, at 204, the candidate entities program 110a, 110b assigns scores to all entities in the determined ontology classes. The candidate entities program 110a, 110b may determine all entities (e.g., entities E) in each ontology class (e.g., ontology class o) in O. The candidate entities program 110a, 110b may then assign a score to each entity in E which may be equal to:

$$\frac{1}{\text{number of entities in } o}$$

Table 1, below, may depict source code (e.g., a set of instructions that a computer executes) for scoring related entities for each input entity.

TABLE 1

```
public static Map<String, Entity> scoreEntities(Map<String, Category>
categories) {
    Map<String, Entity> scoredEntities = null;
    try {
        if(categories != null && !categories.isEmpty( )) {
            scoredEntities = new HashMap<>( );
            for(Category c: categories.values( )) {
                Map<String, OntologyClass> ontologyClasses =
                    c.getOntologyClasses( );
                if(ontologyClasses != null && !ontologyClasses.isEmpty( )) {
                    for(OntologyClass o: ontologyClasses.values( )) {
                        Map<String, Entity> entities = o.getEntities( );
                        if(entities != null && !entities.isEmpty( )) {
                            for(Entity e: entities. values( )) {
                                double newScore = calculateScore(entities.size( ));
                                if(scoredEntities.containsKey(e.getCanonicalName(
                                    ))) {
                                    Entity temp =
                                    scoredEntities.get(e.getCanonicalName( ));
                                    double currentScore = temp.getScore( );
                                    temp.setScore(currentScore + newScore);
                                    scoredEntities.put(e.getCanonicalName( ), temp);
                                } else {
                                    Entity temp = new Entity(e.getCanonicalName( ),
                                        e.getDisplayName( ),
                                        e.getType( ),
                                        e.getMostSimilarInputEntity( ));
                                    temp.setScore(newScore);
                                    scoredEntities.put(temp.getCanonicalName( ),
                                        temp);
                                }
                            }
                        } // end for loop for entities
                    }
                } // end for loop for ontology classes
            }
        } // end for loop for categories
    }
    } catch (Exception e) {
        LOGGER.error(e.getMessage( ));
        throw e;
    }
    return scoredEntities;
}
public static float calculateScore(float numberOfEntities) {
    if(numberOfEntities > 0F) {
        return 1 / numberOfEntities;
    } else {
        return 0;
    }
}
```

Continuing with the above example, the candidate entities program 110a, 110b may score each entity in each ontology class for each input entity. For input entity A, the scored entities would be as follows:

$O_1(A=\frac{1}{3}, C=\frac{1}{3}, D=\frac{1}{3})$, where the number of entities in $O_1$ is 3.

$O_3(A=\frac{1}{6}, B=\frac{1}{6}, C=\frac{1}{6}, D=\frac{1}{6}, F=\frac{1}{6})$, where the number of entities in $O_3$ is 6.

$O_4(A=\frac{1}{2}, F=\frac{1}{2})$, where the number of entities in $O_4$ is 2.

Similarly, for input entity B, the scored entities would be as follows:

$O_2(B=\frac{1}{4}, D=\frac{1}{4}, E=\frac{1}{4}, F=\frac{1}{4})$, where the number of entities in $O_2$ is 4.

$O_3(A=\frac{1}{6}, B=\frac{1}{6}, C=\frac{1}{6}, D=\frac{1}{6}, E=\frac{1}{6}, F=\frac{1}{6})$, where the number of entities in $O_3$ is 6.

Next, at 206, the candidate entities program 110a, 110b ranks related entities based on an assigned score. The candidate entities program 110a, 110b may add all entities from the ontology classes in O to a list (e.g., list L). If an entity exists across multiple ontology classes, then the candidate entities program 110a, 110b may add the scores for that entity. After the assigned scores have been added, the list L may contain distinct entities with respect to i.

Table 2, below, may depict source code to rank related entities based on the assigned score.

TABLE 2

```
public static List<Entity> rankEntities(Map<String, Entity> entities) {
    List<Entity> scoredEntities = null ;
    try {
        if(entities != null && !entities.isEmpty( )) {
            scoredEntities = new ArrayList<>( );
            scoredEntities.addAll(entities.values( ));
            scoredEntities.sort(Entity.COMPARE_BY_SCORE);
            for(int i = 0; i < scoredEntities.size( );) {
                double currentScore = scoredEntities.get(i).getScore( );
                int j = i + 1;
                while (j < scoredEntities.size( ) &&
                    currentScore == scoredEntities.get(j).getScore( )) {
                    j++;
                }
                float rankToAssign = calculateRank(i + 1, j);
                for(int k = i; k < j; k++) {
                    Entity e = scoredEntities.get(k);
                    e.setRank(rankToAssign);
                }
                i = j;
            }
        }
    } catch (Exception e) {
        LOGGER.error(e.getMessage( ));
    }
    return scoredEntities;
}
public static float calculateRank(int start, int end) {
    int n = end - start + 1;
    float sumOfRanks = (n / 2F) * (end + start);
    return sumOfRanks / n;
}
```

Continuing with the above example, for each input entity, the candidate entities program 110a, 110b creates a single ranked list. If any entity exists across multiple classes, the candidate entities program 110, 110b adds the scores for that entity. For input entity A, entities C and D exist in ontologies $O_1$ and $O_3$, entity F exists in ontologies $O_3$ and $O_4$, and entity A exists in ontologies $O_1$, $O_3$, and $O_4$. The candidate entities program 110a, 110b adds the scores for the input entities, and the scored set of entities for input entity A is as follows.

$A=\frac{1}{3}+\frac{1}{6}+\frac{1}{2}=1$ $B=\frac{1}{6}=0.167$ $C=\frac{1}{3}+\frac{1}{6}=0.5$ $D=\frac{1}{3}+\frac{1}{6}=0.05$ $E=\frac{1}{6}=0.167$ $F=\frac{1}{6}+\frac{1}{2}=0.667$ Likewise, for input entity B, entities B, D, E, and F exist in ontology $O_2$ and $O_3$. The scored set of entities for input entity B is as follows:

$A=\frac{1}{6}=0.167$ $B=\frac{1}{4}+\frac{1}{6}=0.416$ $C=\frac{1}{6}=0.167$ $D=\frac{1}{4}+\frac{1}{6}=0.416$ $E=\frac{1}{4}+\frac{1}{6}=0.416$ $F=\frac{1}{4}+\frac{1}{6}=0.416$ Next, at 208, the candidate entities program 110a, 110b sorts the ranked list of input entities. The candidate entities program 110a, 110b may sort the list (e.g., list L) of input entities in descending order of score. This may mean that the entity at the top of the list L may have the highest score, and the entity at the bottom of the list L may have the lowest score. After sorting the list L, the first entity within the set of input entities (e.g., input entities I) may be input entity i, having the highest score.

Continuing with the above example, for input entity A, the scores may be sorted in descending order and the input entities may be removed. The sorted scores for entity A may be as follows:

F=0.667, C=0.5, D=0.5, E=0.167

Similarly, for input entity B, the scores may be sorted in descending order and the input entities may be removed. The sorted scores for entity B may as follows:

D=0.416, E=0.416, F=0.416, C=0.167

Next, at 210, the candidate entities program 110a, 110b assigns a metric to each entity. At this step, the candidate entities program 110a, 110b may normalize the ontology list of assigned entity scores. For each entity i in the list L, the candidate entities program 110a, 110b may assign a metric which may be equal to the number of entities having a better score than the entity i. For example, for a given entity, the metric may be equal to the number of entities above entity i in the sorted list L.

The top input entity i.0 (where i represents an input entity and 0 represents the entity's place in a sorted list) in the sorted list L may have a metric equal to 0 as there are no entities above the top input entity i in the sort list L. Likewise, the fifth entity i.5 may have a metric of 4 as there are 4 entities above i.5 in the sorted list L.

If the same score is assigned to two or more entities at 206, then the same metric may be assigned at 210.

Continuing with the above example, for input entity A, entity F may acquire a rank of 1, and the ranks of C and D may be averaged since they are tied. The ranks for C and D, which are tied for the second position in the rank, may be averaged as follows:

$$\frac{2+3}{2} = 2.5$$

The last input entity, E, in the ranked list above may be assigned a rank of 4, indicating the input entity's position in the ranked list. Thus, the resulting ranked list for entity A may be as follows:

F=1, C=2.5, D=2.5, E=4

Likewise, for input entity B, entities D, E, and F are tied at first so an average rank of 2 is assigned. Thus, the resulting ranked list for entity B may be as follows:

D=2, E=2, F=2, C=4

Finally, at 212, the candidate entities program 110a, 110b removes the input entity i from the sorted list L and retains the entities with the lowest metrics across all sets. The candidate entities program 110a, 110b may determine the number of entities with the same assigned metric, as described previously with respect to step 210 above.

This step may result in a set of lists $L_1, L_2, L_3 \ldots L_n$ for input entities $i_1, i_2, i_3 \ldots i_n$. The candidate entities program 110a, 110b may merge the resulting lists to obtain a final candidate set of entities (e.g., final candidate set of entities C). If an entity exists in more than one resulting list, then while merging the resulting lists, the candidate entities program 110a, 110b may select the lowest metric for the entity to add to the final candidate set of entities C.

While compiling the final candidate set of entities C, the candidate entities program 110a, 110b may avoid entities with the same metric (e.g., the candidate entities program 110a, 110b may choose entities with the fewest number of equal metrics). For example, if entities A, B are in list $L_1$ and each have a metric of 2, and entities A, C, and D are in list $L_2$ and each have a metric of 2, then the candidate entities program 110a, 110b may choose the entity A from list $L_1$ since there are fewer equal metrics (e.g., $L_1$ has 2 equal metrics while $L_3$ has 3 equal metrics). The candidate entities program may count the number of entities tied at the same metric and may choose the metric with fewer ties.

The final candidate set of entities C may include the most relevant (e.g., similar) entities for each input entity.

Table 3, below, may depict source code for retaining the highest rank for entities which exist across multiple user input entities.

TABLE 3

```
public static Map<String, Entity>
retainHighestRankedEntities(List<Entity> rankedEntities,
    Map<String, Entity> highestRankedEntitiesMap, String
    inputEntity) {
try {
    if(rankedEntities != null && !rankedEntities.isEmpty( )) {
        for(Entity e: rankedEntities) {
            if(e.getMostSimilarInputEntity( ) == null) {
                e.setMostSimilarInputEntity(inputEntity);
            }
            if(highestRankedEntitiesMap.containsKey(e.getCanonicalName(
            ))) {
                Entity e2 =
                highestRankedEntitiesMap.get(e.getCanonicalName( ));
                if(e.getRank( ) < e2.getRank( )) {
                    highestRankedEntitiesMap.put(e.getCanonicalName( ), e);
                }
            } else {
                highestRankedEntitiesMap.put(e.getCanonicalName( ), e);
            }
        }
    }
} catch (Exception e) {
    LOGGER.error(e.getMessage( ));
}
return highestRankedEntitiesMap;
}
```

Continuing with the above example, the ranked lists for input entities A and B may be merged and the highest ranks may be retained. The resulting candidate set of input entities may be as follows:

F=1, D=2, E=2, C=2.5

Referring now to FIG. 3, an exemplary embodiment of input entities, inputted into the candidate entities program 110a, 110b according to at least one embodiment is depicted. Input entities 300, 302, and 304, representing three sets of genes, CDK1, CDK2, and CREB1, respectively, may be inputted into the candidate entities program 110a, 110b. After the candidate entities program 110a, 110b scores and ranks the input entities, as described previously with respect to steps 204 and 206 above, three individual ranked lists with distinct genes may be generated. The candidate entities program 110a, 110b may create a final merged list, as described previously with respect to step 208 above, which is also a candidate set of genes. The highest ranked genes across the three ranked lists may be retained by the candidate entities program 110a, 110b, as described previously with respect to step 212 above. The resulting candidate set of entities may include the top ranked genes in the candidate set for CDK1 300, CDK2 302, and CREB1 304.

Figure 4:
FIG. 4 is an exemplary embodiment of a resulting candidate set of entities generated by the candidate entities program according to at least one embodiment.

Referring now to FIG. 4, an exemplary embodiment of a resulting candidate set of entities 400 generated by the candidate entities program 110a, 110b according to at least one embodiment is depicted. The resulting candidate set of entities 400 depicts the top ten genes that resulted from the input entities 300, 302, and 304, after the scoring and ranking algorithm of the candidate entities program 110a, 110b, described above with respect to steps 202 through 212, was performed.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
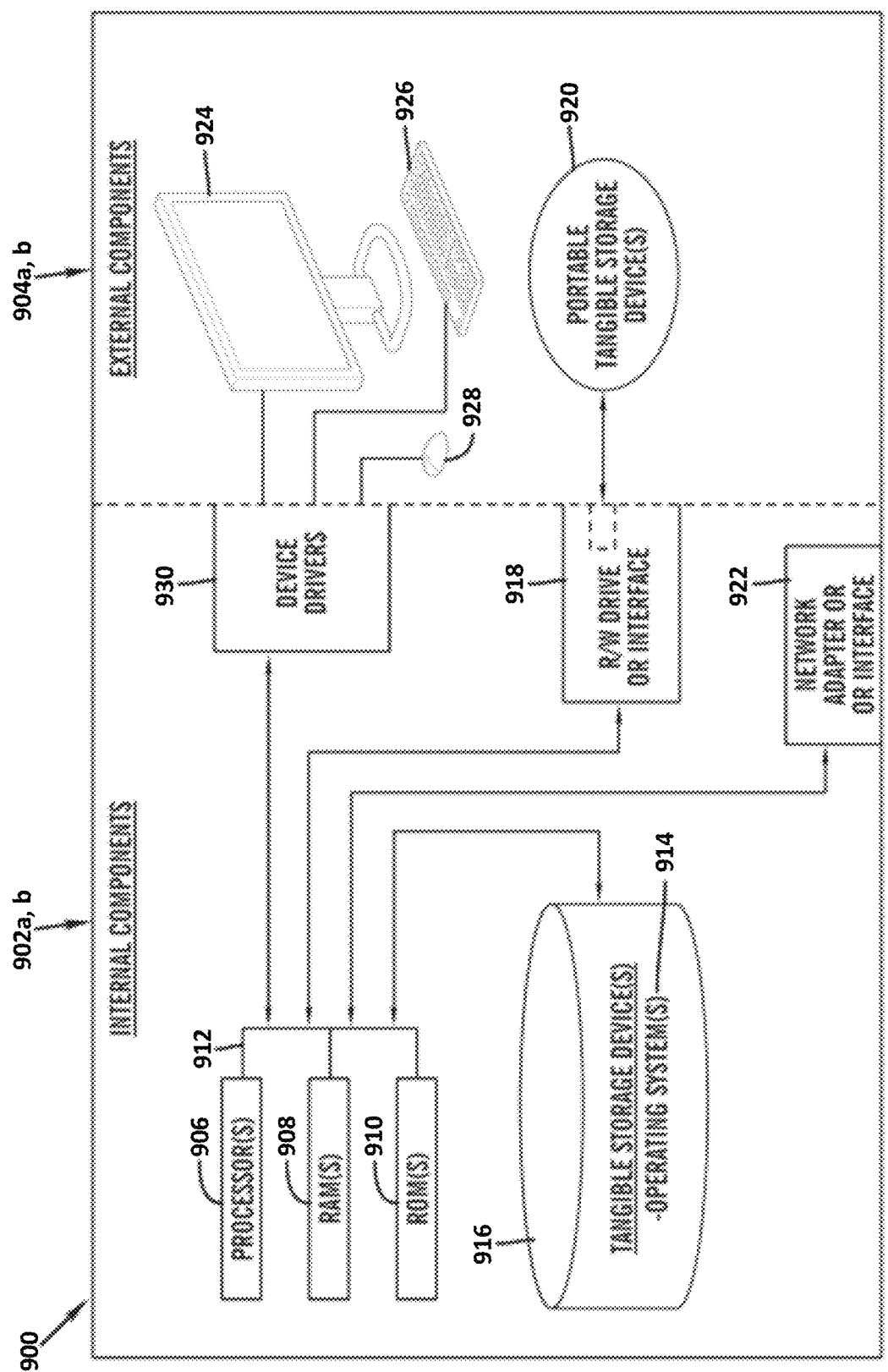
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the candidate entities program 110a in client computer 102, and the candidate entities program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the candidate entities program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the candidate entities program 110a in client computer 102 and the candidate entities program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the candidate entities program 110a in client computer 102 and the candidate entities program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
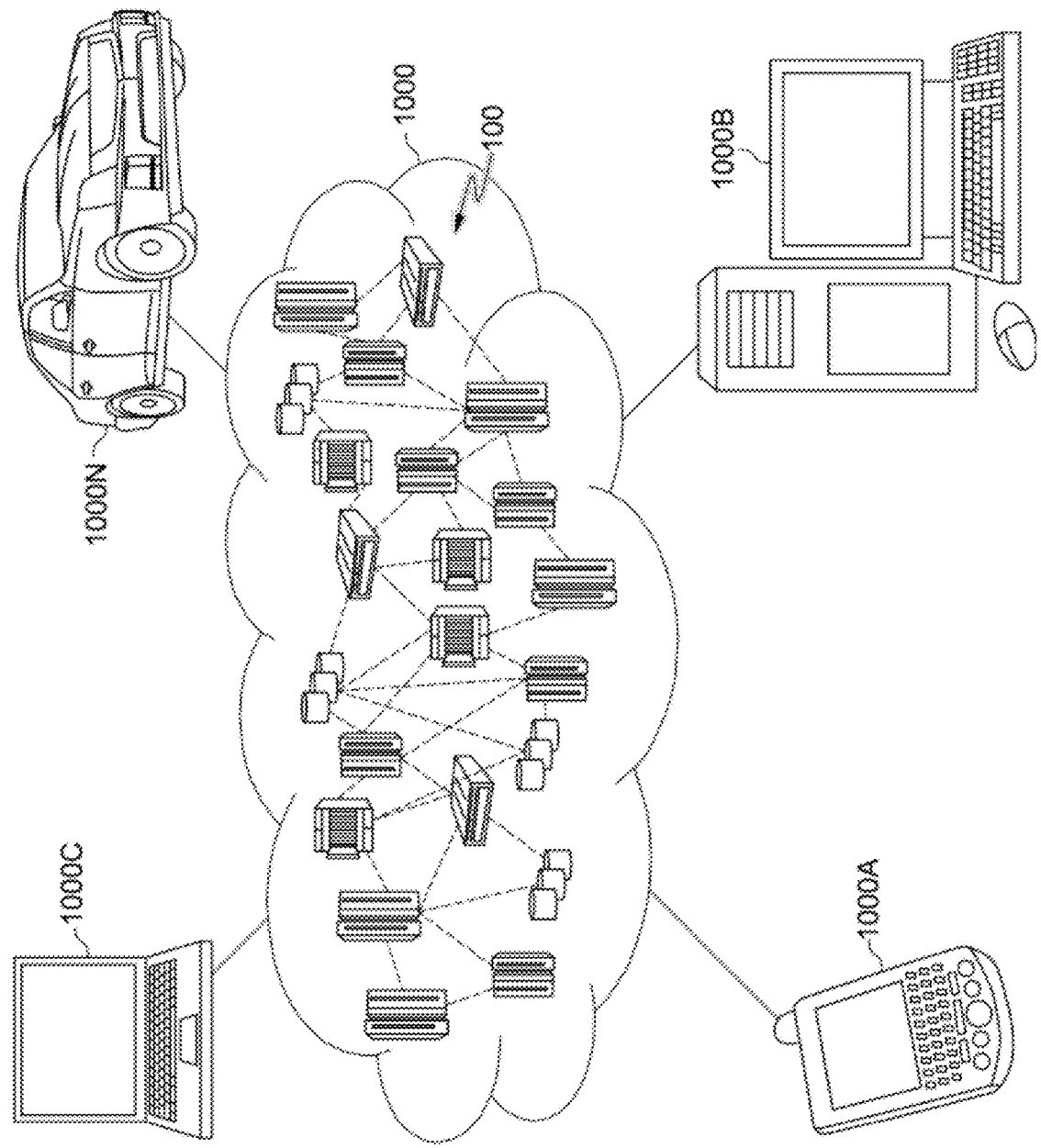
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
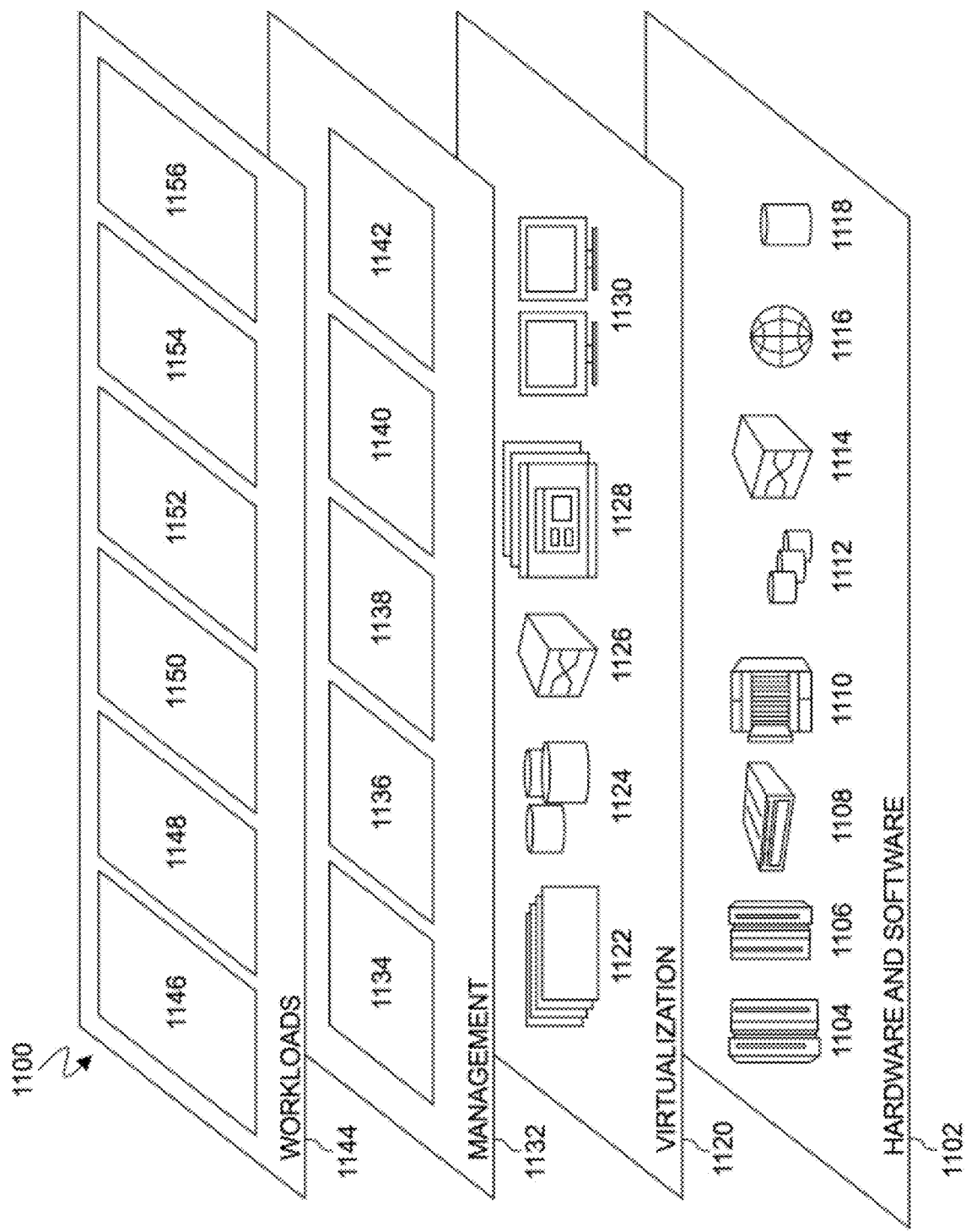
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and candidate entities 1156. A candidate entities program 110a, 110b provides a way to use the classification of entities into different classes and classes into ontologies to find candidate entities which may be similar to a training set of entities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a candidate set of entities from a training set of entities, the method comprising:
    determining an ontology class for an input entity in the training set of entities, wherein the input entity is inputted into an interface for the method;
    adding the input entity to an ontology list;
    assigning an entity score to the input entity;
    normalizing the ontology list of entity scores; and
    selecting the candidate set of entities with the lowest entity score, wherein the candidate set of entities includes a most similar entity to the input entity, and wherein the most similar entity and the input entity are not identified based on co-occurrence in any known documents.

2. The method of claim 1, wherein adding the input entity to the ontology list further comprises:
    grouping one or more input entities based on the ontology class.

3. The method of claim 1, wherein the entity score is equal to a sum of an inverse of the ontology class size.

4. The method of claim 1, further comprising:
    summing the entity scores of an entity determined to exist in more than one ontology class.

5. The method of claim 1, wherein normalizing the ontology list of entity scores further comprises:
    removing the input entity from a scored set of input entities;
    assigning a metric to the input entity;
    generating a set of ranked lists for the scored set of input entities; and
    merging the set of ranked lists by selecting a lowest metric for the input entity to add to the candidate set of entities, wherein a highest ranked gene from each of the set of ranked lists is retained to comprise the candidate set of entities.

6. The method of claim 5, wherein assigning a metric to the input entity further comprises:
    determining a number of entities above the input entity in a sorted list.

7. The method of claim 6, further comprising:
    selecting an input entity with a lowest metric based on the input entity existing in more than one ontology class.

8. A computer system for generating a candidate set of entities from a training set of entities, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    determining an ontology class for an input entity in the training set of entities, wherein the input entity is inputted into an interface for the method;
    adding the input entity to an ontology list;
    assigning an entity score to the input entity;
    normalizing the ontology list of entity scores; and
    selecting the candidate set of entities with the lowest entity score, wherein the candidate set of entities includes a most similar entity to the input entity, and wherein the most similar entity and the input entity are not identified based on co-occurrence in any known documents.

9. The computer system of claim 8, wherein adding the input entity to the ontology list further comprises:
    grouping one or more input entities based on the ontology class.

10. The computer system of claim 8, wherein the entity score is equal to a sum of an inverse of the ontology class size.

11. The computer system of claim 8, further comprising:
    summing the entity scores of an entity determined to exist in more than one ontology class.

12. The computer system of claim 8, wherein normalizing the ontology list of entity scores further comprises:
    removing the input entity from a scored set of input entities;
    assigning a metric to the input entity;
    generating a set of ranked lists for the scored set of input entities; and
    merging the set of ranked lists by selecting a lowest metric for the input entity to add to the candidate set of entities, wherein a highest ranked gene from each of the set of ranked lists is retained to comprise the candidate set of entities.

13. The computer system of claim 12, wherein assigning a metric to the input entity further comprises:
    determining a number of entities above the input entity in a sorted list.

14. The computer system of claim 13, further comprising:
    selecting an input entity with a lowest metric based on the input entity existing in more than one ontology class.

15. A computer program product for generating a candidate set of entities from a training set of entities, comprising:
    one or more non-transitory computer-readable storage media and program instructions stored on at least one of the one or more tangible storage media, the program instructions executable by a processor to cause the processor to perform a method comprising:
    determining an ontology class for an input entity in the training set of entities, wherein the input entity is inputted into an interface for the method;
    adding the input entity to an ontology list;
    assigning an entity score to the input entity;
    normalizing the ontology list of entity scores; and
    selecting the candidate set of entities with the lowest entity score, wherein the candidate set of entities includes a most similar entity to the input entity, and wherein the most similar entity and the input entity are not identified based on co-occurrence in any known documents.

16. The computer program product of claim 15, wherein adding the input entity to the ontology list further comprises:
    grouping one or more input entities based on the ontology class.

17. The computer program product of claim 15, wherein the entity score is equal to a sum of an inverse of the ontology class size.

18. The computer program product of claim 15, further comprising:
  summing the entity scores of an entity determined to exist in more than one ontology class.

19. The computer program product of claim 15, wherein normalizing the ontology list of entity scores further comprises:
  removing the input entity from a scored set of input entities;
  assigning a metric to the input entity;
  generating a set of ranked lists for the scored set of input entities; and
  merging the set of ranked lists by selecting a lowest metric for the input entity to add to the candidate set of entities, wherein a highest ranked gene from each of the set of ranked lists is retained to comprise the candidate set of entities.

20. The computer program product of claim 19, wherein assigning a metric to the input entity further comprises:
  determining a number of entities above the input entity in a sorted list.

* * * * *